United States Patent
Kapoor et al.

(10) Patent No.: US 10,175,967 B2
(45) Date of Patent: Jan. 8, 2019

(54) MIGRATING APPLICATIONS TO UPDATED ENVIRONMENTS

(71) Applicant: International Business Machines Coporation, Armonk, NY (US)

(72) Inventors: Shubir Kapoor, Yorktown Heights, NY (US); Tian Cheng Liu, Beijing (CN); Anca Sailer, Scarsdale, NY (US); Bo Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 82 days.

(21) Appl. No.: 15/403,216

(22) Filed: Jan. 11, 2017

(65) Prior Publication Data

US 2018/0196655 A1 Jul. 12, 2018

(51) Int. Cl.
*G06F 8/61* (2018.01)
*H04L 29/08* (2006.01)

(52) U.S. Cl.
CPC ............... *G06F 8/61* (2013.01); *H04L 67/10* (2013.01)

(58) Field of Classification Search
CPC ........................................................ G06F 8/61
USPC ........................................................ 717/177
See application file for complete search history.

(56) References Cited

U.S. PATENT DOCUMENTS

| 9,183,378 B2 | 11/2015 | Banerjee et al. | |
| 9,608,931 B2* | 3/2017 | Sharma | H04L 47/70 |
| 9,841,991 B2* | 12/2017 | Sizemore | G06F 9/48 |
| 2007/0256058 A1* | 11/2007 | Marfatia | G06F 8/51 717/137 |
| 2009/0241100 A1* | 9/2009 | Sakurai | G06F 11/1433 717/170 |
| 2011/0107327 A1* | 5/2011 | Barkie | G06F 8/63 717/176 |
| 2012/0131567 A1* | 5/2012 | Barros | G06F 9/5088 717/170 |
| 2014/0156813 A1 | 6/2014 | Zheng et al. | |
| 2014/0282456 A1* | 9/2014 | Drost | G06F 8/76 717/158 |
| 2015/0082290 A1* | 3/2015 | Peled | G06F 8/51 717/137 |

(Continued)

OTHER PUBLICATIONS

"What is Application Migration"; Definition from WhatIs.com [full URL in ref.]; Captured by the Wayback Machine Internet Archive (archive.org) on Dec. 15, 2015 (Year: 2015).*

(Continued)

*Primary Examiner* — Qing Chen
*Assistant Examiner* — Clint Thatcher
(74) *Attorney, Agent, or Firm* — Cantor Colburn LLP; Kevin Jordan

(57) ABSTRACT

A migration system for migrating an application between environments is provided. The migration system includes analyzes a profile of the application on a first environment based on a conformance check. The migration system reconstructs application dependencies with respect to a second environment, based on the application profile analysis, to produce an updated environment with reconstructed application dependencies. The migration system migrates the application from the first environment to the updated environment with the reconstructed application dependencies.

12 Claims, 7 Drawing Sheets

(56) References Cited

U.S. PATENT DOCUMENTS

2015/0261842 A1 9/2015 Huang et al.
2018/0081740 A1* 3/2018 Syed .......................... G06F 8/76

OTHER PUBLICATIONS

Tarun Saxena; "10 Things to Keep in Mind While Migrating the Applications Between Two Cloud Platforms"; ToTheNew.com blog page [full URL in ref.]; Oct. 24, 2016.*

* cited by examiner

MIGRATING APPLICATIONS TO UPDATED ENVIRONMENTS

BACKGROUND

The present invention relates generally to migrating applications between environments, and more specifically, to migrating a PaaS application to an updated environment.

Development techniques e.g., platform as a service (PaaS) and the like, can speed-up development, building, and deployment of an application and subsequent versions/updates of the application to developers. However, a native (such as of a native PaaS) environment can be insufficient for special requirements of the developers when the application is deployed to and hosted on another, e.g., target environment. For example, a native PaaS environment can be insufficient where an online application serves information-sensitive end-user data, which requires special security policies. As another example, a native environment of PaaS can also be insufficient when an online application binds with sensitive data, which also requires special security policies. As a further example, a native PaaS environment can also be insufficient when an online application is deployed to a target environment with local data support.

SUMMARY

One or more embodiments of the present invention include system for migrating an application. The system analyzes a profile of the application on a first environment. The system reconstructs application dependencies with respect to a second environment, based on the application profile analysis, to produce an updated environment with reconstructed application dependencies. The system also migrates the application from the first environment to the updated environment with the reconstructed application dependencies.

Other embodiments include a computer-implemented method and a computer program product.

BRIEF DESCRIPTION OF THE DRAWINGS

The subject matter described herein is particularly pointed out and distinctly claimed in the claims at the conclusion of the specification. The forgoing and other features, and advantages of the embodiments herein are apparent from the following detailed description taken in conjunction with the accompanying drawings, in which:

DETAILED DESCRIPTION

Figure 1:
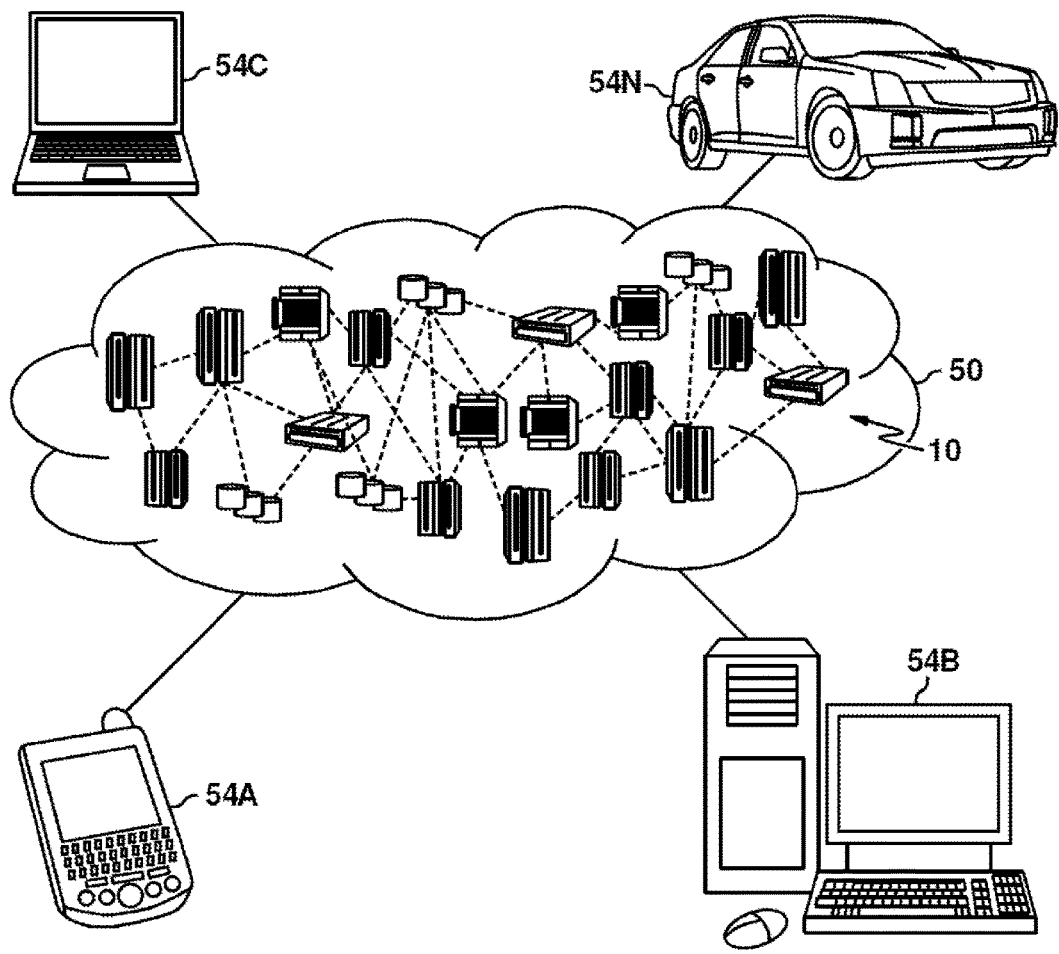
FIG. 1 depicts a cloud computing environment according to one or more embodiments of the present invention.

It is understood in advance that although a detailed description of a cloud computing embodiment is included, implementation of the teachings recited herein are not limited to a cloud computing environment. Rather, embodiments herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
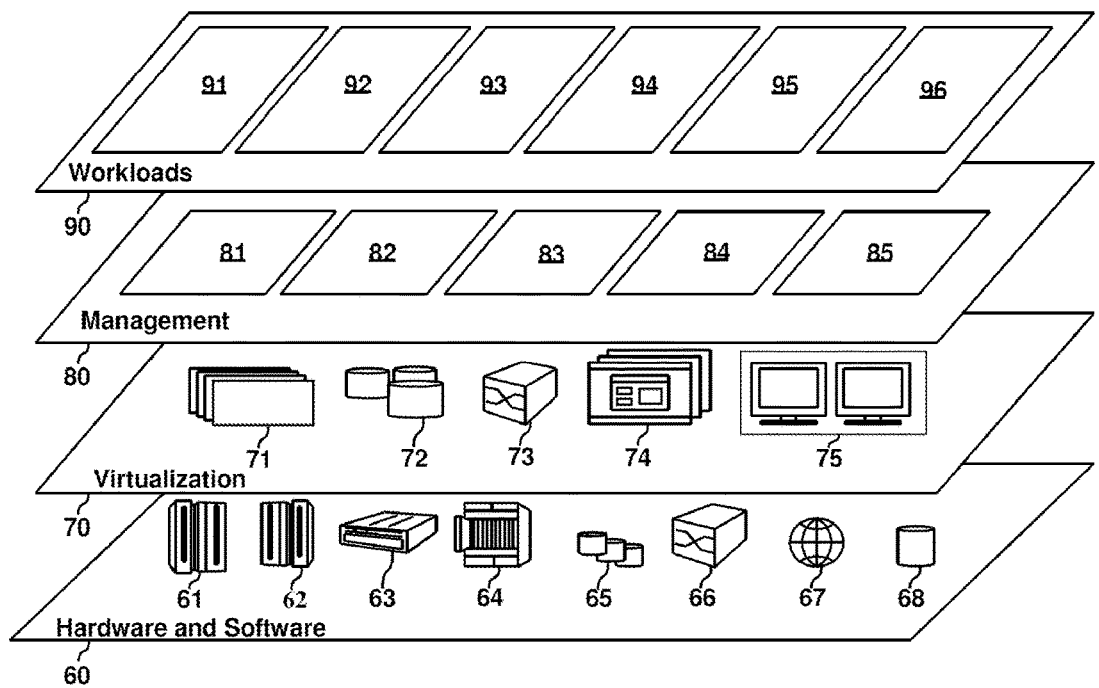
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments herein are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and migration functionality 96 in accordance with the present invention.

In view of the above, embodiments of the invention include a system, method, and/or computer program product (also referred to herein as a migration system) for migrating applications between environments. In some embodiments, a conformance checker validates conformance requirements and a reconstructor is configured to reconstruct application dependencies when migrating applications from a first environment (such as PaaS) to an updated environment (e.g., a target environment updated to receive the applications; the target environment can also be a PaaS environment). Technical effects and benefits of the migrating system herein include supporting, by utilizing a conformance checker and a dependency reconstructor, required special security policies of PaaS applications the serve and bind to information-sensitive end-user data when migrating PaaS applications to updated environments. Technical effects and benefits of the migrating system herein include providing local data support, by utilizing the conformance checker and the dependency reconstructor, when the PaaS applications deploys to the updated environment. Embodiments of the migrating system described herein are necessarily rooted in processors of the migrating system to perform proactive operations to overcome problems specifically arising in the realm of migrating the PaaS applications to the updated environments.

Figure 3:
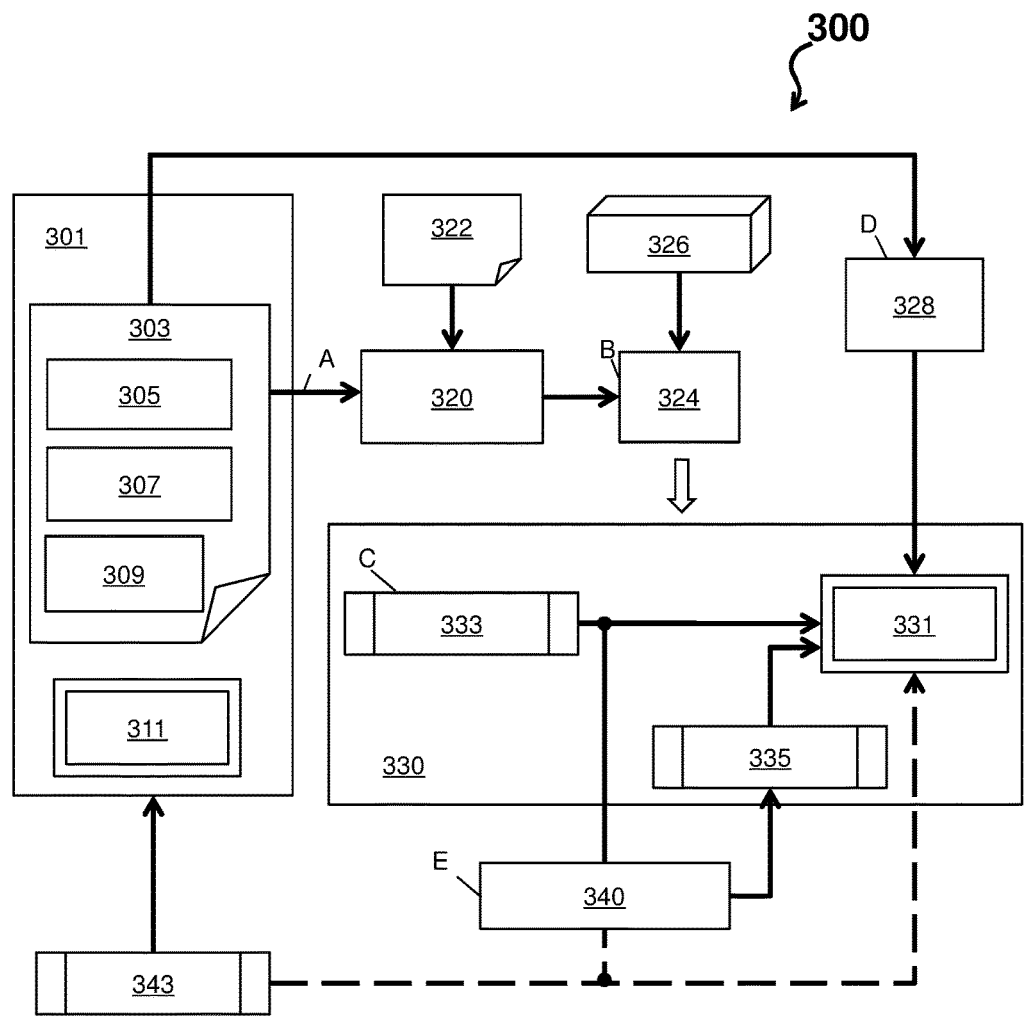
FIG. 3 depicts a flow schematic of a migration system in accordance with one or more embodiments of the present invention.

Turning now to FIG. 3, a system 300 illustrates an example of a migration system in accordance with one or more embodiments of the present invention. The system 300 can be an electronic, computer framework comprising and/ or employing any number and combination of processing systems (e.g., as described with respect to FIGS. 1-2) and networks utilizing various communication technologies, as described herein. As shown, the system 300 comprises a PaaS 301 that includes an application profile 303, which comprises environment variables 305, a service source 307, and an application source 309, and an application 311. The system 300 also comprises a conformance checker 320, checking rules 322, an imitator 324, service modules 326, a deployer 328, and an updated environment 330 (which includes a migrated application 331, a service instance 333, and environment variables 335), a reconstructor 340 and a service instance 343. In general, the system 300 migrates the application 311 from the PaaS 301 to the updated environment 330, which results in the migrated application 331. Note that FIG. 3 provides demarcations A, B, C, D, and E, each of which notes an operation of and/or communication between components of the system 300. The demarcations A, B, C, D, and E are not intended to be limiting and are herein referenced to assist with the explanation of the system 300.

The PaaS 301 can be a Platform as a Service environment, such as the example described herein. The application profile 303 can be a software configuration related to the application 311 (e.g., a hosting PaaS application), stored on the PaaS 301, and utilized to generate modified dependences for the application 311 (e.g., the migrated application 331) to the updated environment 330. The software configuration of the application 311 can be defined by the environment variables 305, the service source 307, and the application source 309. The environment variables 305 can comprise run-time dependencies of the application 311, as customized by developers. The service source 307 can also comprise run-time dependencies of the application 311, such as binding information of a database service, as customized by the developers. Binding information can comprise protocol setting that the database service uses to communicate with the application 311. The application source 309 can comprise deployment dependencies of the application 311, examples of which include git repository links, war/zip/tar file urls, etc.

The conformance checker 320 can be configured to automatically check a specification against an application source code scan and a dependency validation test. In various embodiments, conformance checker 320 can be embodied in software, hardware, or a combination thereof. In operation, the application profile 303, including the environment variables 305, the service source 307, and the application source 309, is retrieved (as shown by demarcation A of FIG. 3) from the PaaS 301 by the conformance checker 320. The conformance checker 320 can utilize checking rules 322 to automatically check conformance requirements of the updated environment 330 against the retrieved application profile 303 (e.g., to analyze source PaaS environment profile for a PaaS application). The conformance requirements of the updated environment 330 can be fine-grained, precise rules related to a target environment for automatic checking based on a specification of PaaS development template and guidance. Note that the checking rules 322 can be provided by on the conformance checker 320 or can be provided by another party (or application/system component) to the conformance checker 320. Examples of the checking rules 322 include Heuristic 1, Heuristic 2, and Heuristic 3 provided below. In a non-limiting embodiment, for each item that is found in nonconformance, the conformance checker 320 can provide automatic fix suggestions.

Heuristic 1:
    If application source 309 is {platform: Bluemix, app_type: Type1, source_type:Source1, source_url: "git://"}
    Then Check
        {source code availability on $ source_url}
        {source code structure conformance to Type1}
        {Package.json file is complete}
        {App.js file is complete}
        {Server.js file is complete}

Heuristic 2:
    If PaaS 301 is {platform: Bluemix, environment variables 305: Set}
    Then Check
        {source code is developed with environment variables 305 reference in VCAP Services and USER Defined}

Heuristic 3:
    If service source 307 is {database: Database1, Environment variables: Set}
    Then Check
        {credentials are set in environment variables 305}
        {access endpoint and credentials are valid for target environment}

The imitator 324 can be configured (as shown by demarcation B of FIG. 3, in an example operation), to create/imitate the conformance requirements of the application 311 as defined by the environment variables 305 and the service source 307 on the updated environment 330. In various embodiments, the imitator 324 can be embodied in software, hardware, or a combination thereof. The service module 326, which can be a software component of the imitator, can be configured to support the creation/imitation of the environment variables 305 and the service source 307. Further, the imitator 324 can set up (as shown by demarcation C of FIG. 3) mapped runtime environment variables and services as the service instance 333 in the updated environment 330 based on the analysis of the source PaaS environment profile for the application 311. Note the service instance 333 in the updated environment 330, while an imitation of the service instance 343, is distinct from the service instance 343 used by the PaaS 301.

The deployer 328 can be configured (as shown by demarcation D of FIG. 3), in an example operation, to transfer the application 311 to the updated environment 330, which results in the migrated application 331. In various embodiments, the deployer 328 can be embodied in software, hardware, or a combination thereof. In some embodiments, the deployer 328 packages, transfers, and migrates/deploys the source application (e.g., the application 311) to the updated environment 330.

The updated environment 330 can be a Platform as a Service environment, such as the example described herein. The updated environment 330 comprises a target environment, for which the application 311 is destined to execute within, that has received the application dependencies reconstructed. That is, the target environment can be a Platform as a Service environment that has been updated to properly execute the application 311.

The reconstructor 340, can be configured to reconstruct application dependencies for environment variables and service bindings on the updated environment 330 based on the analyzing of the source PaaS environment profile for the application 311. In various embodiments, the reconstructor 340 can be embodied in software, hardware, or a combination thereof. The reconstructor 340 can also be configured to update the environment variables and the service bindings with auto mapping based on generating conformance service access endpoint information in the updated environment 330.

For example, while the application 311 is running in the PaaS 301, the application 311 can call the environment variables 343 and the service bindings of the PaaS 301. Once the migrated application 331 is running on the updated environment 330, environment variables and service bindings in the updated environment 330 need to be updated so that the migrated application 331 can make similar calls. Thus, a new service instance 343 can be initialized and related service configuration and information (e.g., conformance requirements) can be used to the update environment variables 335. These updated environment variables 335 can be used to reconstruct (as shown by demarcation E of FIG. 3) by the reconstructor 340 the dependences for the migrated application 331 in the updated environment 330. Note that a technical effect and benefit is that a code of the migrated application 331 does not need to be changed based on the operations of the reconstructor 340.

Figure 4:
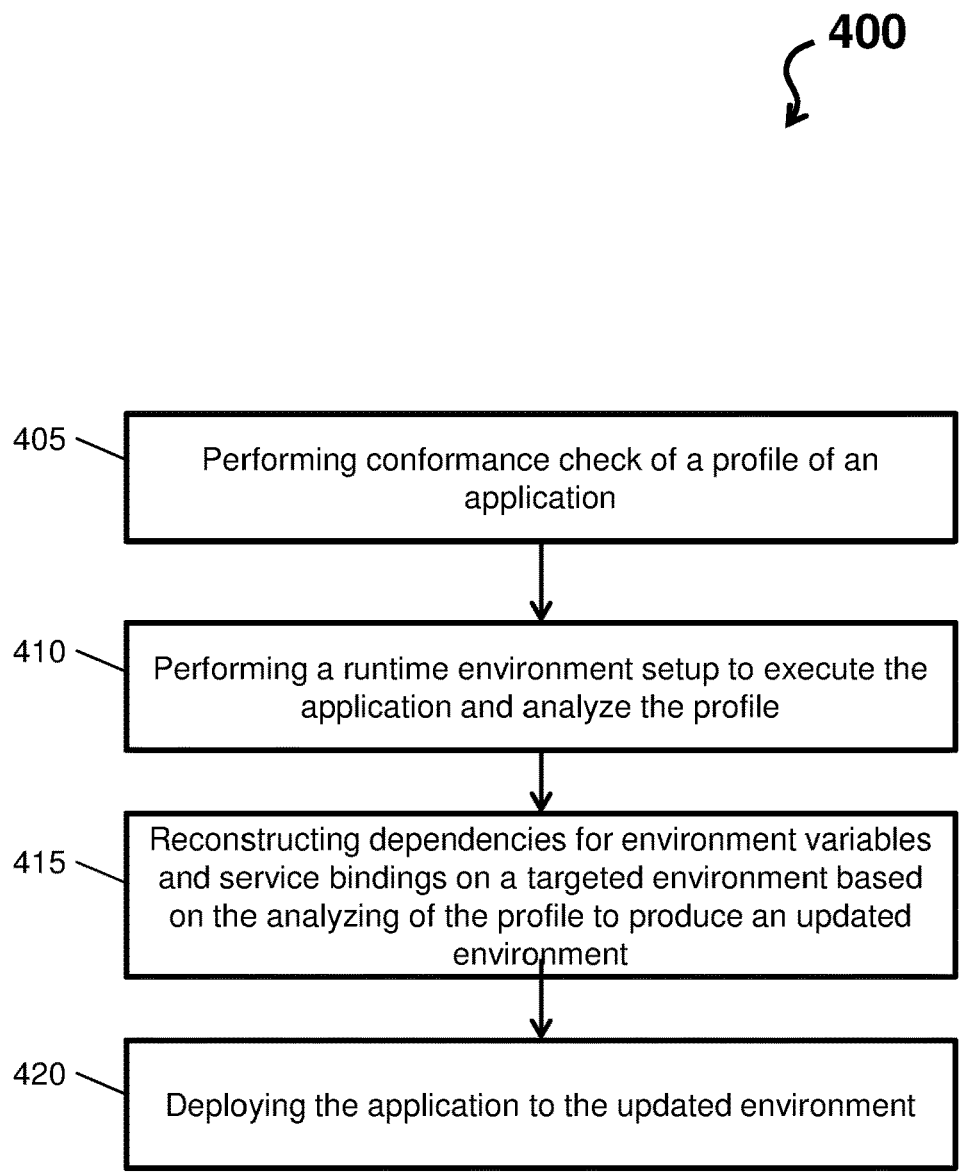
FIG. 4 depicts a process flow of a migration system in accordance with one or more embodiments of the present invention.

Turning now to FIG. 4, a process flow 400 of a migration system is generally shown in accordance with one or more embodiments of the present invention. The process flow 400 begins at block 405, where a conformance checker of the migration system utilizes checking rules to perform a conformance check of a profile of an application on a first environment (e.g., a PaaS environment). At block 410, an imitator of the migration system performs a runtime environment setup to provide a service instance where the application can be executed and the application profile can be analyzed. At block 415, a reconstructor of the migration system reconstructs application dependencies for environment variables and service bindings on a targeted environment based on the analyzing of the profile. With the application dependencies reconstructed, the target environment now reflects the updated environment, which is ready to migrate the application. At block 420, a deployer of the migration system migrates/deploys the application to the updated environment.

Figure 5:
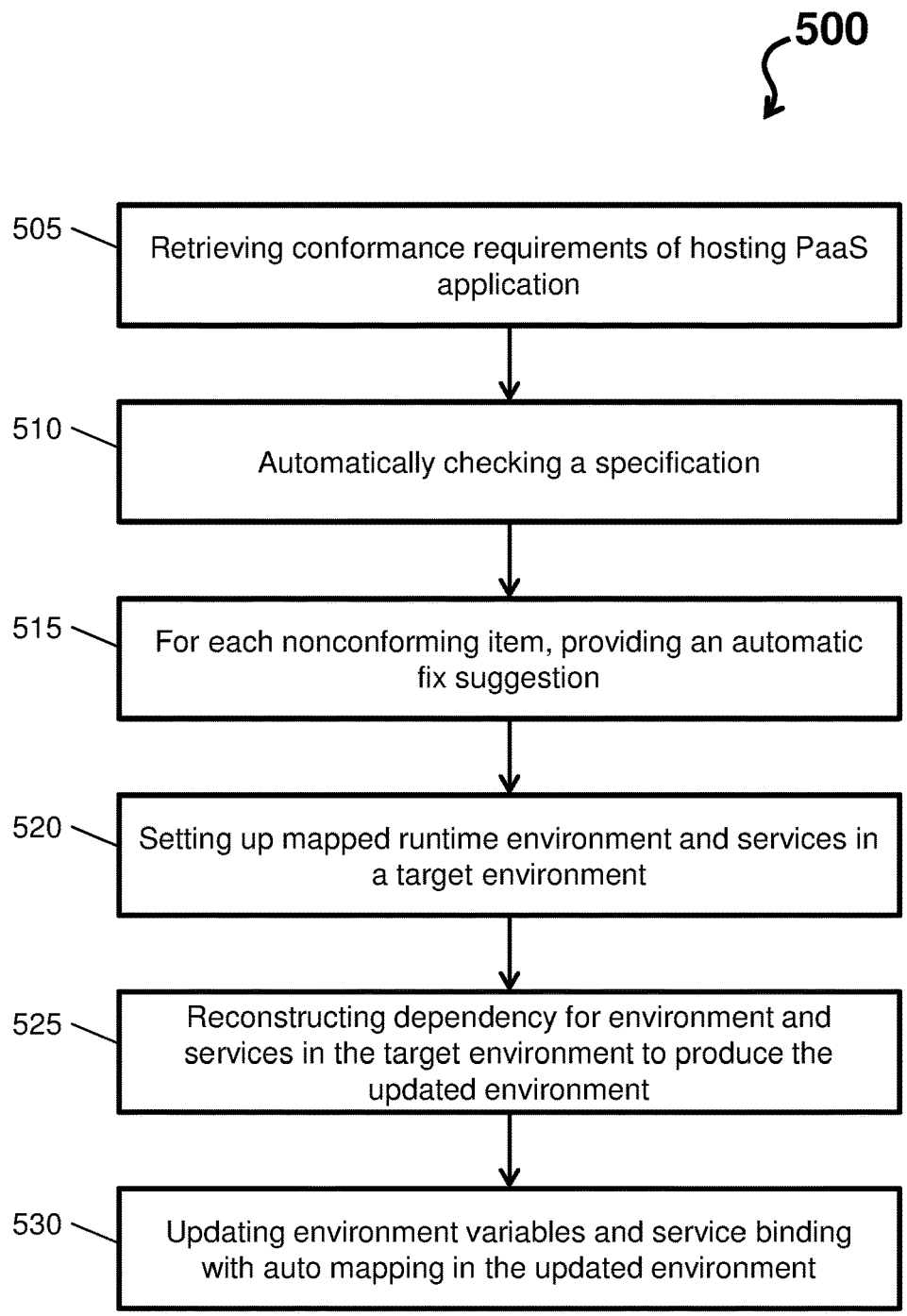
FIG. 5 depicts a process flow of a migration system in accordance with one or more embodiments of the present invention.

Turning now to FIG. 5, a process flow 500 of a migration system is generally shown in accordance with one or more embodiments of the present invention. At block 505, conformance requirements of a hosting PaaS application are retrieved. The conformance requirements are composed of fine-grained, precise rules suitable for automatic checking based on a specification of PaaS development template. The conformance requirements can be retrieved from a PaaS, itself.

At block 510, a conformance checker automatically checks the specification. The specification can be checked against an application source code scan and a dependency validation test. At block 515, for each item that is found in nonconformance, an option of automatic fix suggestions is provided e.g., by output to a display device (not depicted).

At block 520, mapped runtime environment variables and services in a target environment are set up based on analyzing application profile on the PaaS. At block 525, reconstructing dependency for the environment variables and services on the target environment based on analyzing a source PaaS environment profile for the hosting PaaS application is performed, thereby making the target environment an updated environment capable of executing the hosting PaaS application. At block 530, the environment variables and service bindings with auto mapping are updated based on generating conformance service access endpoint information in the updated environment.

Figure 6:
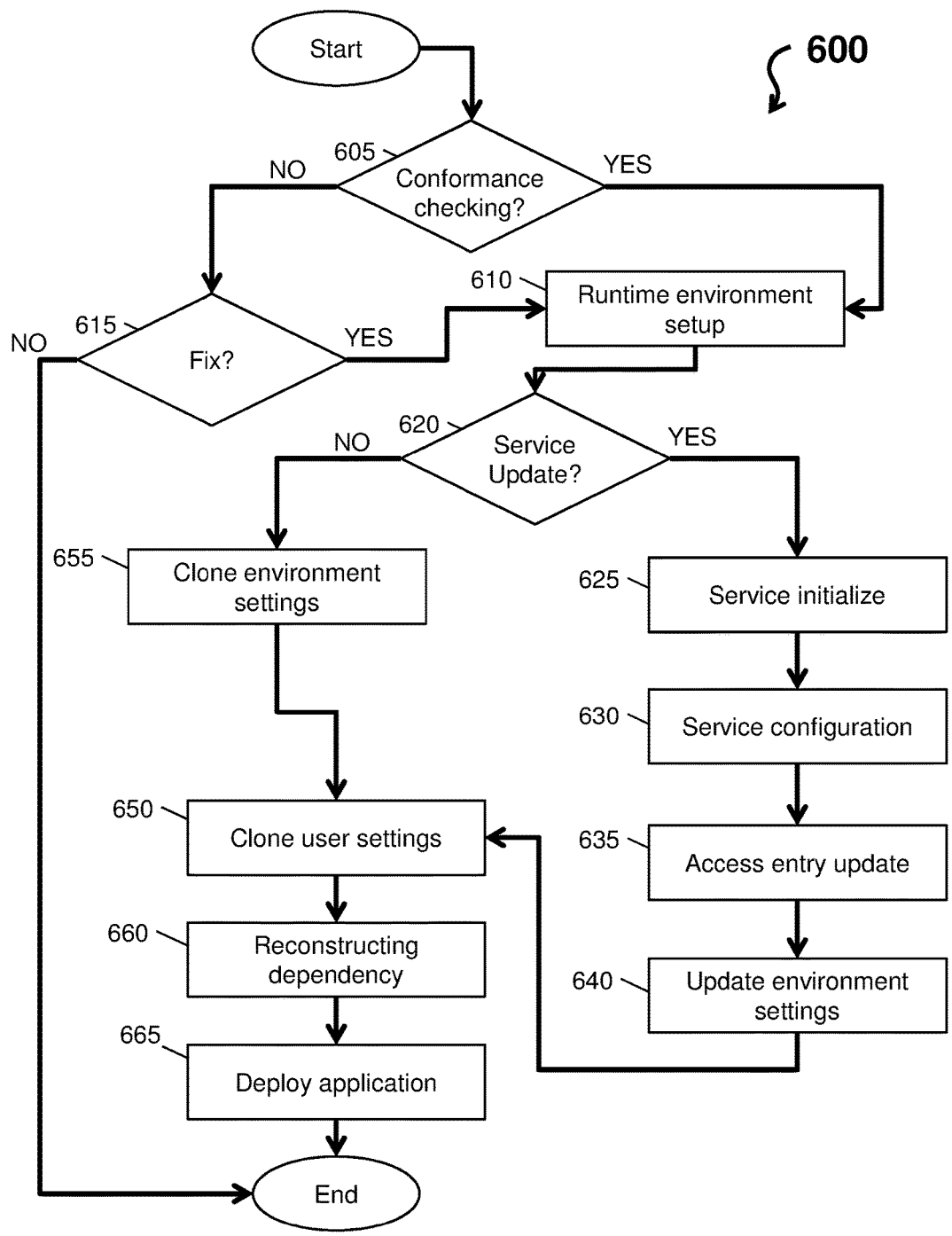
FIG. 6 depicts a process flow of a migration system in accordance with one or more embodiments of the present invention.

Turning now to FIG. 6, a process flow 600 of a migration system is generally shown in accordance with one or more embodiments of the present invention. The process flow 600 begins at decision block 605, where a conformance checker checks whether an application profile of a PaaS application on a PaaS conforms to checking rules. For example, the conformance checker performs a conformance check utilizing checking rules to automatically check each item of conformance requirements of migration prerequisites against a source PaaS environment profile for the PaaS application. If conformance checker determines that the source PaaS environment profile conforms to the conformance requirements of the migration prerequisites, the process flow 600 proceeds to block 610 (as indicated by the YES arrow). At block 610, an imitator performs a runtime environment setup.

Returning to decision block 605, if conformance checker determines that the source PaaS environment profile does not conform to the conformance requirements, the process flow 600 proceeds to decision block 615 (as indicated by the No arrow). At decision block 615, the conformance checker determines if an automatic fix is available for each item of the source PaaS environment profile that is found in nonconformance with the conformance requirements. If the automatic fix is not available, then the process flow 600 proceeds to End (as indicated by the No arrow). If the automatic fix is available, the conformance checker can provide that fix and proceed to block 610 (as indicated by the YES arrow). In a non-limiting embodiment, a user can determine whether to accept any automatic fix that is available, thereby forcing the process to End or to proceed to block 610. To provide the fix, the conformance checker can automatically change a code of the PaaS application to conform to the migration prerequisites.

From block 610, the process proceeds to decision block 620. At decision block 620, whether a service requires updates is determined. To check if the service needs to be updated, the conformance checker can attempt to access an access point of a source instance of the service. The conformance checker will return a result about a target environment for the application if it is accessible. If the service requires updates (e.g., the access point is not accessible), the process flow 600 proceeds to block 625 (as indicated by the YES arrow). At block 625, the service is initialized. The service can be initialized by an imitator using service modules as a service instance in the target environment. Note the service instance in the target environment, while an imitation of the source instance (e.g., service source) of the PaaS application, is distinct from the source instance.

At block 630, the service is configured. The service can be configured by the imitator using the service modules as the service instance in the target environment. At block 635, access entry is updated. The access entry is updated so that the PaaS application can be bound to the service once it is deployed to the target environment (because if the PaaS application is not bound, then the PaaS application will not have access to the service once deployed). At block 640, the environment settings are updated. Similarly, the environment settings are based on the target environment, which is different than the PaaS environment. At block 650, user settings are cloned. For example, the variables from the PaaS environment are cloned to the target environment. Note that the process flow 600 can also arrive at block 650 if at the decision block 620, the service does not require updates (the access point is accessible, then no update needed). In this case, the process flow 600 can proceed from decision block 620 to block 655 since the access entry points and service information are valid for the target environment. At block 655, the user settings are cloned.

From block 650, the process proceeds to block 660. At decision block 660, a reconstructor reconstructs application dependencies (in turn=, the target environment can be referred to as an updated environment). At block 655, the application is deployed (e.g., to the updated environment). In a non-limiting embodiment, packages the application code and deploy files, and perform installation of the application into the updated environment to create a migrated application. Then, the process flow 600 proceeds to End.

While it is understood that software embodiments of the migration system may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Figure 7:
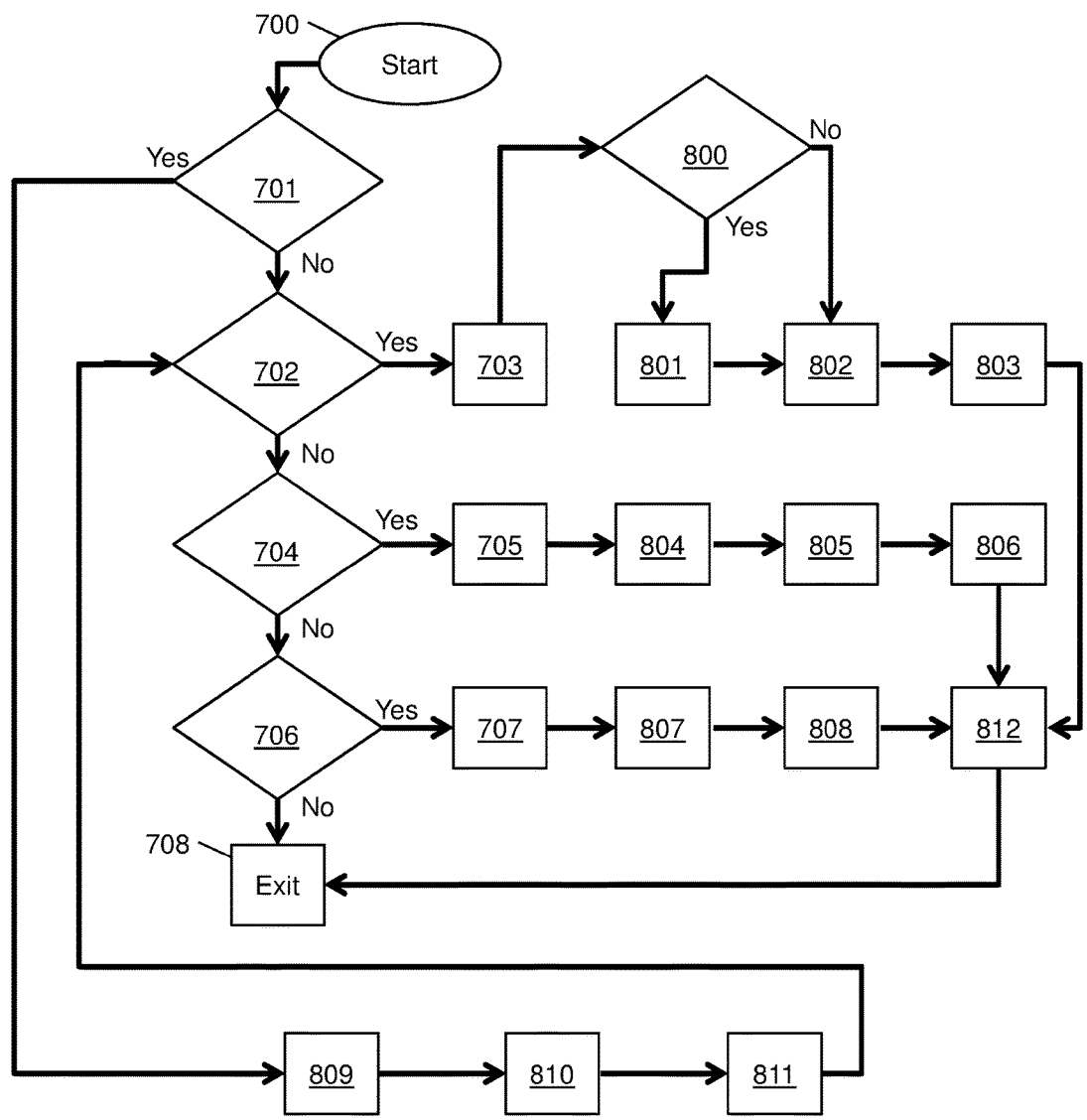
FIG. 7 depicts a process flow of a deployment operation in accordance with one or more embodiments of the present invention.

Turning now to FIG. 7, a process flow of a deployment operation is generally shown in accordance with one or more embodiments of the present invention. The process flow begins at block 700, with the deployment of the process software. At block decision 701, whether there are any programs that will reside on a server or servers when the process software is executed is determined. If there are programs that will reside on a server or servers, the process proceeds to block 809 (as indicated by the Yes arrow). At block 809, the servers that will contain the executables are identified. At block 810, the process software for the server or servers is transferred directly to the servers' storage via FTP or some other protocol or by copying though the use of a shared file system. At block 811, The process software is then installed on the servers. The process flow then proceed to decision block 702.

If there are no programs that will reside on a server or servers, the process proceeds to decision block 702 (as indicated by the No arrow). At decision block 702, a determination is made as to whether the process software is to be deployed by having users access the process software on a server or servers. If the users are to access the process software on servers, then the process flow proceeds to block 703 (as indicated by the Yes arrow). At block 703, the server addresses that will store the process software are identified. Then, at decision block 800, a determination is made if a proxy server is to be built to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, as determined in decision block 800, then the process flow proceeds to block 801. At block 801, the proxy server is installed. Then, at block 802, the process software is sent to the (one or more) servers either via a protocol such as FTP, or it is copied directly from the source files to the server files via file sharing (note that if the proxy server is not required, then the process flow can proceed directly to block 802 from decision block 800, as indicated by the no arrow). Another embodiment involves sending a transaction to the (one or more) servers that contained the process software, and have the server process the transaction and then receive and copy the process software to the server's file system. Once the process software is stored at the servers, the process proceeds to block 803. At block 803, the users via their client computers then access the process software on the servers and copy to their client computers file systems. Another embodiment is to have the servers automatically copy the process software to each client and then run the installation program for the process software at each client computer. At block 812, the user executes the program that installs the process software on his client computer. At block 708, the process flow then exits.

If the users are not to access the process software on servers, then the process flow proceeds to decision block 704 (as indicated by the No arrow). At decision block 704, a determination is made whether the process software is to be deployed by sending the process software to users via e-mail. If the process software is to be deployed by sending the process software to users via e-mail, then the process flow proceeds to block 705. At block 705, the set of users where the process software will be deployed are identified together with the addresses of the user client computers. At block 804, the process software is sent via e-mail to each of the users' client computers. At block 805, users then receive the e-mail. At block 806, the process software is detached from the e-mail to a directory on their client computers. At block 812, the user executes the program that installs the process software on his client computer. At block 708, the process flow then exits.

If the process software is not to be deployed by sending the process software to users via e-mail, then the process flow proceeds to decision block 706. At block 706 a determination is made on whether the process software will be sent directly to user directories on their client computers. If the process software will be sent directly to user directories on their client computers, then the process flow proceeds to decision block 707. Otherwise, at block 708, the process flow exits. At block 707, the user directories are identified. At block 807, the process software is transferred directly to the user's client computer directory. This can be done in several ways such as, but not limited to, sharing the file system directories and then copying from the sender's file system to the recipient user's file system or, alternatively, using a transfer protocol such as File Transfer Protocol (FTP). At block 808, the users access the directories on their client file systems in preparation for installing the process software. At block 812, the user executes the program that installs the process software on his client computer. At block 708, the process flow then exits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for migrating an application between environments, the system comprising:
   a processor; and
   a memory, operably coupled to the processor, the memory storing program instructions thereon, the program instructions executable by the processor to cause the system to:
   analyze a profile of an application on a first environment;
   reconstruct application dependencies utilizing a conformance check to implement security policies of the system, the application dependencies are reconstructed with respect to a service instance of a second environment based on the application profile analysis to produce an updated environment, the system generating mapped runtime environment variables and services as the service instance based on analyzing the application profile, the updated environment serves and binds information-sensitive end-user data during migrating of the application, the updated environment comprising the reconstructed application dependencies, the conformance check being an automatic check of conformance requirements of migration prerequisites against the application profile; and
   migrate the application from the first environment to the updated environment with the reconstructed application dependencies.

2. The system of claim 1, wherein the first environment comprises a Platform as a Service environment, and wherein the second environment comprises a target environment.

3. The system of claim 1, wherein the program instructions are further executable by the processor to cause the system to provide an option for automatic fix for each item of the application profile that is found in nonconformance during the conformance check.

4. The system of claim 1, wherein the application dependencies comprise environment variables and service bindings on the updated environment.

5. The system of claim 1, wherein environment variables and service bindings of the application are updated with auto mapping based on generating conformance service access endpoint information in the second environment.

6. The system of claim 1, wherein the system is provided as a service in a cloud environment.

7. A computer program product for migrating an application between environments, the computer program product comprising a computer readable storage medium having program instructions embodied therewith, the program instructions executable by a processor to cause the processor to:
   analyze a profile of an application on a first environment;
   reconstruct application dependencies utilizing a conformance check to implement security policies of the system, the application dependencies are reconstructed with respect to a service instance of a second environment based on the application profile analysis to produce an updated environment, the system generating mapped runtime environment variables and services as the service instance based on analyzing the application profile, the updated environment serves and binds information-sensitive end-user data during migrating of the application, the updated environment comprising the reconstructed application dependencies, the conformance check being an automatic check of conformance requirements of migration prerequisites against the application profile; and
   migrate the application from the first environment to the updated environment with the reconstructed application dependencies.

8. The computer program product of claim 7, wherein the first environment comprises a Platform as a Service environment, and wherein the second environment comprises a target environment.

9. The computer program product of claim 7, wherein the program instructions further cause the processor to provide an option for automatic fix for each item of the application profile that is found in nonconformance during the conformance check.

10. The computer program product of claim 7, wherein the application dependencies comprise environment variables and service bindings on the updated environment.

11. The computer program product of claim 7, wherein environment variables and service bindings of the application are updated with auto mapping based on generating conformance service access endpoint information in the second environment.

12. The computer program product of claim 7, wherein the computer program product is provided as a service in a cloud environment.

* * * * *